US00RE33837E

United States Patent [19]

Chung et al.

[11] E Patent Number: Re. 33,837

[45] Reissued Date of Patent: Mar. 3, 1992

[54] METHOD AND APPARATUS FOR ACOUSTIC WELL LOGGING

[75] Inventors: Jing-Yau Chung, Houston; Sen-Tsuen Chen, Sugarland; James C. Wainerdi, Richardson; Mark A. Miller, Houston, all of Tex.

[73] Assignee: Exxon Production Research Company, Houston, Tex.

[21] Appl. No.: 389,669

[22] Filed: Aug. 4, 1989

Related U.S. Patent Documents

Reissue of:

[64] Patent No.: 4,685,091
Issued: Aug. 4, 1987
Appl. No.: 609,066
Filed: May 10, 1984

[51] Int. Cl.[5] ..... G01V 1/00; H04R 17/00

[52] U.S. Cl. ..... 367/31; 367/75; 367/151; 367/912; 181/106

[58] Field of Search ..... 367/31, 75, 151, 156, 367/157, 168, 912; 181/102, 104, 105, 106

[56] References Cited

U.S. PATENT DOCUMENTS

| | | | |
|---|---|---|---|
| 2,497,172 | 2/1950 | Kean | 367/173 |
| 3,028,752 | 4/1962 | Bacon | 367/151 |
| 3,325,780 | 6/1967 | Horan | 367/157 |
| 3,470,402 | 9/1969 | Abbott | 310/26 |
| 3,593,255 | 7/1971 | White | 367/912 |
| 3,821,740 | 6/1974 | Ehrlich | 367/103 |
| 3,949,352 | 4/1976 | Vogel | 367/75 |
| 4,184,562 | 1/1980 | Bakamjian | 367/86 |
| 4,312,052 | 1/1982 | Vogel et al. | 367/75 |
| 4,319,345 | 3/1982 | Dennis | 367/912 |
| 4,382,290 | 5/1983 | Havira | 181/104 |
| 4,413,331 | 11/1983 | Rowe, Jr. et al. | 367/155 |
| 4,632,212 | 12/1986 | Benzing | 367/151 |

FOREIGN PATENT DOCUMENTS

| | | |
|---|---|---|
| 031989 | 7/1981 | European Pat. Off. . |
| 8317649 | 5/1984 | France . |
| 83/0024 | 4/1983 | Namibia . |
| 83/0043 | 7/1983 | Namibia . |
| 1193381 | 5/1970 | United Kingdom . |
| 1193382 | 5/1970 | United Kingdom . |
| 1193383 | 5/1970 | United Kingdom . |

OTHER PUBLICATIONS

Winbow, "How to Separate Compressional and Shear Arrivals in a Sonic Log," 50th Annual International Meeting of the Society of Exploration Geophysicists, Houston, Texas, Nov. 17-20, 1980.

Chang, "A High-Temperature Protype Instrument for Downhole Acoustic Sensing", IEEE Transaction on Geoscience and Remote Sensing, vol. GE-22, No. 6, Nov., 1984.

Lanotte et al., "Vibrational Modes, Elastic Stiffness, and Piezomagnetic Strain of a Magnetic Rod", J. Appl. Phys., vol. 54, No. 8, Aug. 1983, pp. 4520-4522.

*Primary Examiner*—Thomas H. Tarcza
*Assistant Examiner*—Daniel T. Pihulic
*Attorney, Agent, or Firm*—Herbert E. O'Niell; Darcell Walker

[57] ABSTRACT

Method and apparatus for acoustic wave generation and transmission into a subsurface earth formation. A logging sonde adapted to be suspended in a borehole within the formation houses a generator means for simultaneously generating a plurality of acoustic waves traveling in the direction of and spaced substantially evenly about the [logitudinal] *longitudinal* axis of the sonde. An acoustic energy reflector means within the housing reflects the waves radially outwards of the axis and into the formation at angles generally perpendicular to the axis. Detectors within the housing spaced longitudinally from the generator and reflector detect acoustic energy in the formation resulting from the reflected waves. In a preferred embodiment, the generator means comprises four cylindrical magnetostrictively energized elements disposed about the central axis of the sonde, each having an axis parallel to the central axis, so that the four axes of the elements, when viewed in the direction of the central axis, define four corners of a square. The elements are designed so that upon energization, a given element vibrates longitudinally out of phase relative to the two elements adjacent thereto, vibration of the four elements in concert generating two positive and two negative waves which, when reflected into the formation, interfere to produce a quadrupole shear wave.

53 Claims, 7 Drawing Sheets

FIG. 1
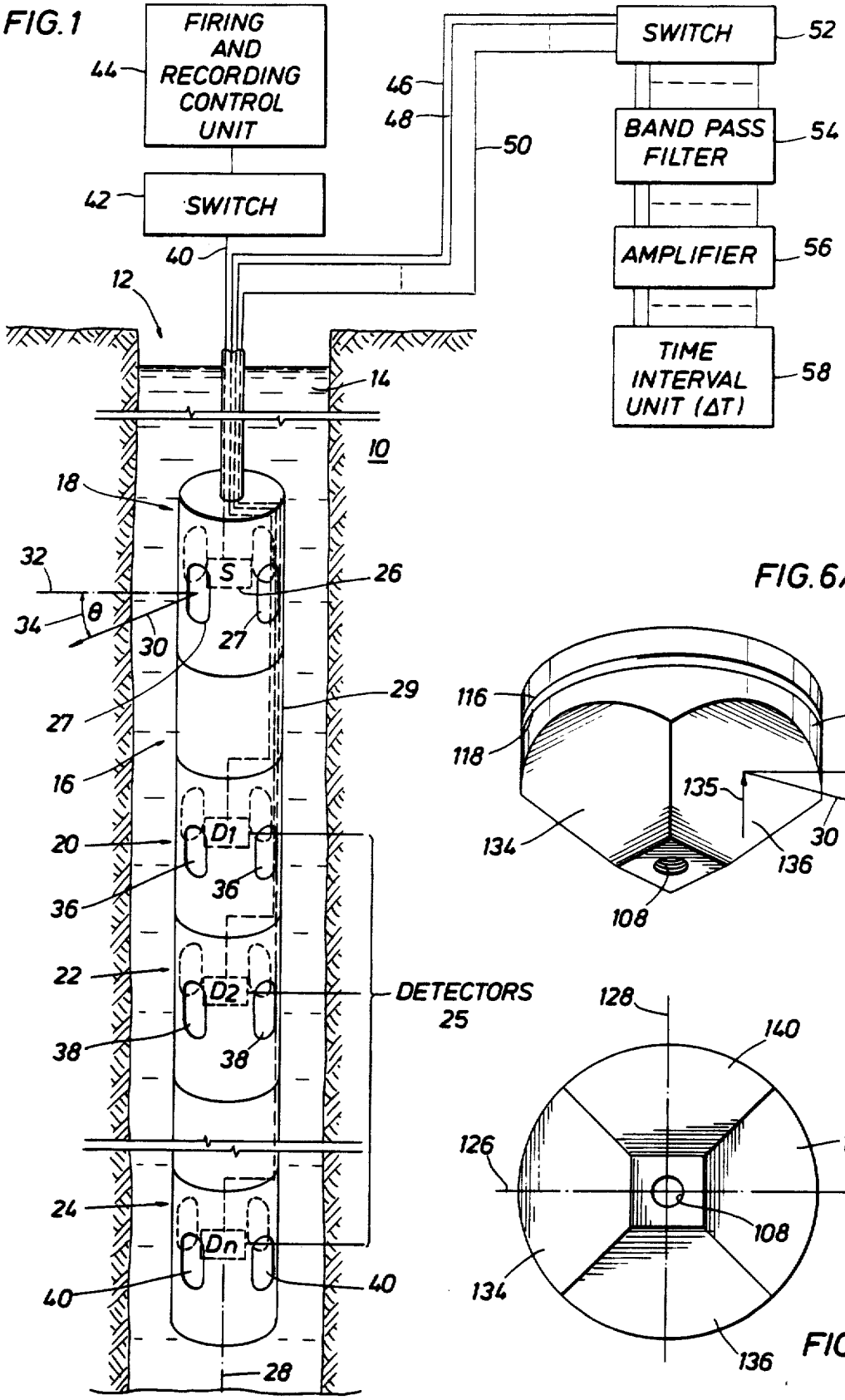
FIG. 6A
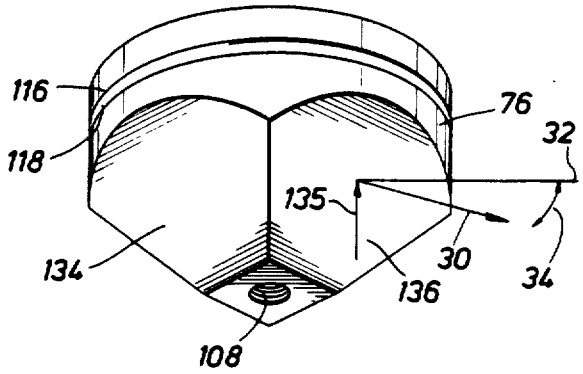
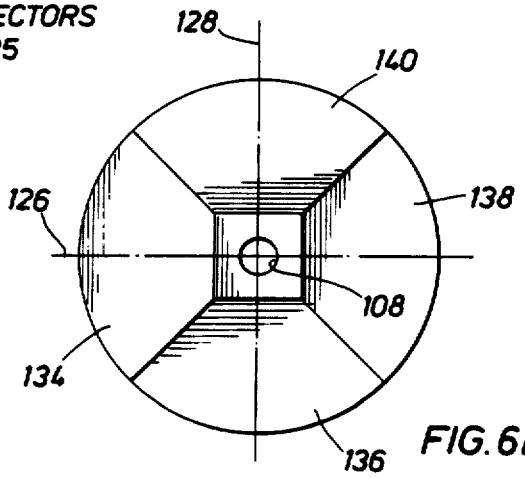
FIG. 6B 102
28
78
76
116
118
70
32
72
30
θ
34
92
90
27
27
88
74
60
96
86
64
94
66
68
83
8
84
26
28
62

FIG. 3
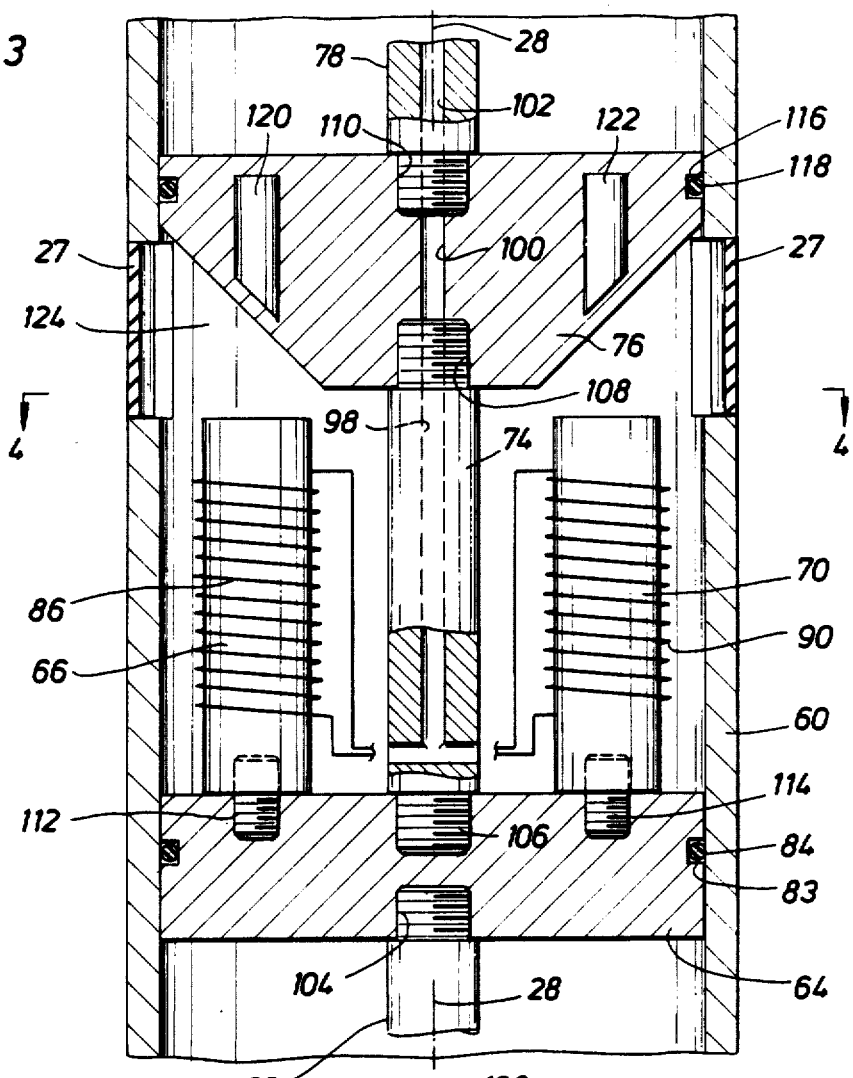
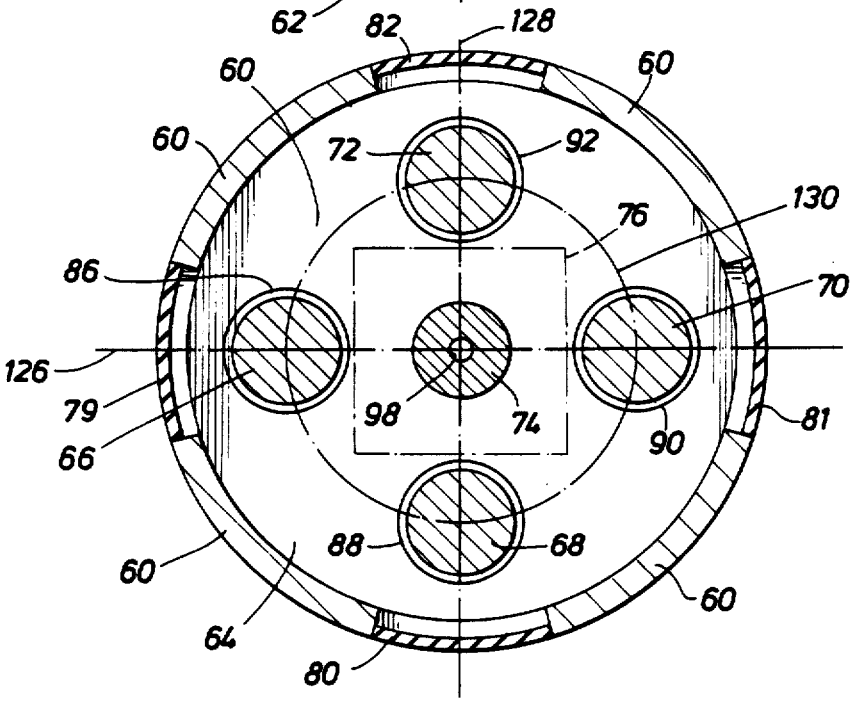
FIG. 4

METHOD AND APPARATUS FOR ACOUSTIC WELL LOGGING

Matter enclosed in heavy brackets [ ] appears in the original patent but forms no part of this reissue specification; matter printed in italics indicates the additions made by reissue.

CROSS-REFERENCES TO RELATED APPLICATIONS

U.S. patent application Ser. Nos. 525,910, filed Aug. 24, 1983 *now U.S. Pat. No. 4,649,526* by Winbow and Baker; U.S. Ser. No. 440,140, filed Nov. 8, 1982 *now abandoned* by Winbow, et al.; U.S. Ser. No. 395,449, filed July 6, 1982 *now U.S. Pat. No. 4,606,014* by Winbow and Chen; and U.S. Ser. No. 379,684 filed May 19, 1982 *now U.S. Pat. No. 4,932,003* by Winbow, et al.; all assigned to Exxon Production Research Company, relate to the general field of this invention.

BACKGROUND OF THE INVENTION

This invention relates to acoustic well logging in general and more particularly to methods and apparatus for generating and detecting acoustic waves in a formation, particularly of the acoustic shear wave type.

It has long been known in the investigation of subsurface earth formations traversed by a borehole that measurements or "logs" of acoustic energy introduced into the formation can yield extremely useful information about various formation parameters and characteristics. Accordingly, it has been conventional to introduce a logging sonde into the borehole containing some form of acoustic wave generator and receiver, to direct acoustic energy from the generator into the formation adjacent the borehole elevation of interest, and to thereafter record with the receiver the resultant acoustic waves returning from the formation.

One acoustic wave of particular interest is known in the art as the "shear" or "S" wave, which may develop in a formation as a result of vibratory motion in the formation at right angles to the direction of travel of the wave. A general discussion of this and related "compressional" (or "pressure") wave phenomena may be found in "The Full Acoustic Wave Train In A Laboratory Model Of A Borehole" by S. T. Chen, Geophysics, Volume 47, No. 11, November 1982, and in the aforementioned patent applications, all of which are herewith incorporated by reference for all purposes.

Shear wave logging has become increasingly useful in the detection of formation fractures as well as in determination of lithological properties of formations and the like. However, several problems have contributed to the difficulty in successful usage of this technique.

For example, often it has been found that the amplitude of the shear wave is insufficient for effective processing and analysis. Typically, the shear wave requires a greater travel time than the compressional wave to traverse the longitudinal distance through the formation between the acoustic generator and the detector. Accordingly, it was often found difficult to discriminate between this first-arriving compressional wave and the later-arriving shear wave (which may arrive before the compressional wave has completely attenuated.

Attempts were made to increase the magnitude of the S wave impinging upon the formation in order to increase the magnitude of the received S wave relative to the other signals, thereby increasing the signal to noise ratio. Such research produced some useful results, such as the realization that the angle at which the acoustic energy was introduced into the formation could enhance the formation of S waves, and the further discovery that multipole acoustic sources, such as quadrupole sources (discussed in aforementioned U.S. patent application Ser. No. 379,684), could more effectively produce desired S waves and provide a means for direct S-wave logging. The expression "multipole source" is used herein to denote sources of dipole, quadropole or higher order acoustic waves; but not to denote axially symmetric monopole sources.

However, severe problems still remained in the successful production of such S waves. For example, it has been known that multipole sources are less efficient acoustic radiators than are monopole sources. Accordingly, to obtain the benefits of multipole sources for direct S-wave logging, with improved signal to noise ratios over the compressional wave "noise" and other noise, more powerful multipole order sources were required.

Several design constraints were presented which hampered the creation of more powerful S wave sources. In particular, for conducting acoustic S-wave logging operations in soft formations it was often necessary to provide strong sources of S waves having frequencies less than three KHz. This, in turn, generally suggested physically large sources to obtain the necessary low resonant frequencies. However, use of large high-voltage source power supplies to energize such physically large sources was disadvantageous due to the attendant need for complicated electric circuit design and due to high voltage noise interference problems associated with such high voltage noise interference problems associated with such high voltage supplies.

SUMMARY OF THE INVENTION

The method and apparatus of the present invention are for the generation and transmission of acoustic waves into a subsurface earth formation traversed by a borehole. The method of the invention generally comprises generating one or more pairs of pressure waves using pairs of vibrating rods, where one element of a given pair vibrates in phase with one element of each of the other pairs (and out of phase with the other element of each of the other pairs), so that the pressure waves initially propagate within a sonde in substantially the same direction parallel to the longitudinal central axis thereof, and thence reflecting each wave radially outwards of the sonde and into the formation at approximately the same borehole elevation whereby a multipole shear wave is established in the formation.

The apparatus of the present invention generally comprises a sonde, adapted to be moved along the borehole, housing an acoustic wave generator means and an acoustic reflector means for respectively generating and reflecting radially outwards the aforesaid pressure waves.

In a preferred embodiment, four pressure waves are generated so at to propagate initially along four axes whose intersection with any plane perpendicular to the central axis of the sonde define the four corners of a quadrilateral and preferably a square. The hereinbefore noted subsequent reflection of any given one of these pressure waves into the formation is such that most of the energy in such reflected wave propagates wave is in a general direction normal to a plane defined by the two axes which in closest proximity to the axis of the given pressure wave. Moreover, the given pressure wave will be out of phase with the pressure waves initially propagating along such two nearest axes.

In such preferred embodiment, the acoustic wave generator means includes four cylindrical rods aligned coaxially along the four axes whereby the rod centers lie on a circle perpendicular to the central axis and are circumferentially equally spaced about the circle, thereby defining first and second pairs of such rods, each pair comprised of two diametrically opposed rods. The rods of the first pair are of an identical first magentostrictive material having a first strain constant and those of the second pair are, in like manner, of an identical magnetostrictive second material different from the first material and further having a second strain constant different from the first strain constant.

Coils around each rod, when electrically energized, induce a magnetic field in the rods parallel to their axes causing surface vibrations at the upper ends of the rods constituting a quadrupole motion, e.g., motion along the rod axes whereby motion of each rod of a given pair is in phase with one another but out of phase with those of the other pair, thereby generating the four pressure waves.

In an embodiment in which four pressure waves are generated by the acoustic wave generator means, the acoustic reflector means preferably comprises an acoustically reflective material defining an inverted, truncated, four-faced pyramid coaxially aligned with the central axs, whereby the upper end of each rod is disposed adjacent to and below a respective face and the axis of each rod intersects the respective face.

BRIEF DESCRIPTION OF THE DRAWINGS

FIG. 1 is a pictorial view, partly schematic, depicting an acoustic logging system of the present invention.

FIG. 3 is an elevational view, in cross-section, of the logging source of FIG. 2 taken on a plane which includes the longitudinal central axis common to the logging sonde depicted in FIG. 1 and the logging source of FIG. 2 contained therein.

FIG. 4 is a plan view in cross-section of the logging source of FIG. 3 taken along line 4—4.

FIG. 6A is a pictorial view of the acoustic reflector of the logging source depicted in FIG. 2.

FIG. 6B is a plan (bottom) view of the acoustic reflector depicted in FIG. 6A.

DETAILED DESCRIPTION OF THE PREFERRED EMBODIMENT

Figure 2:
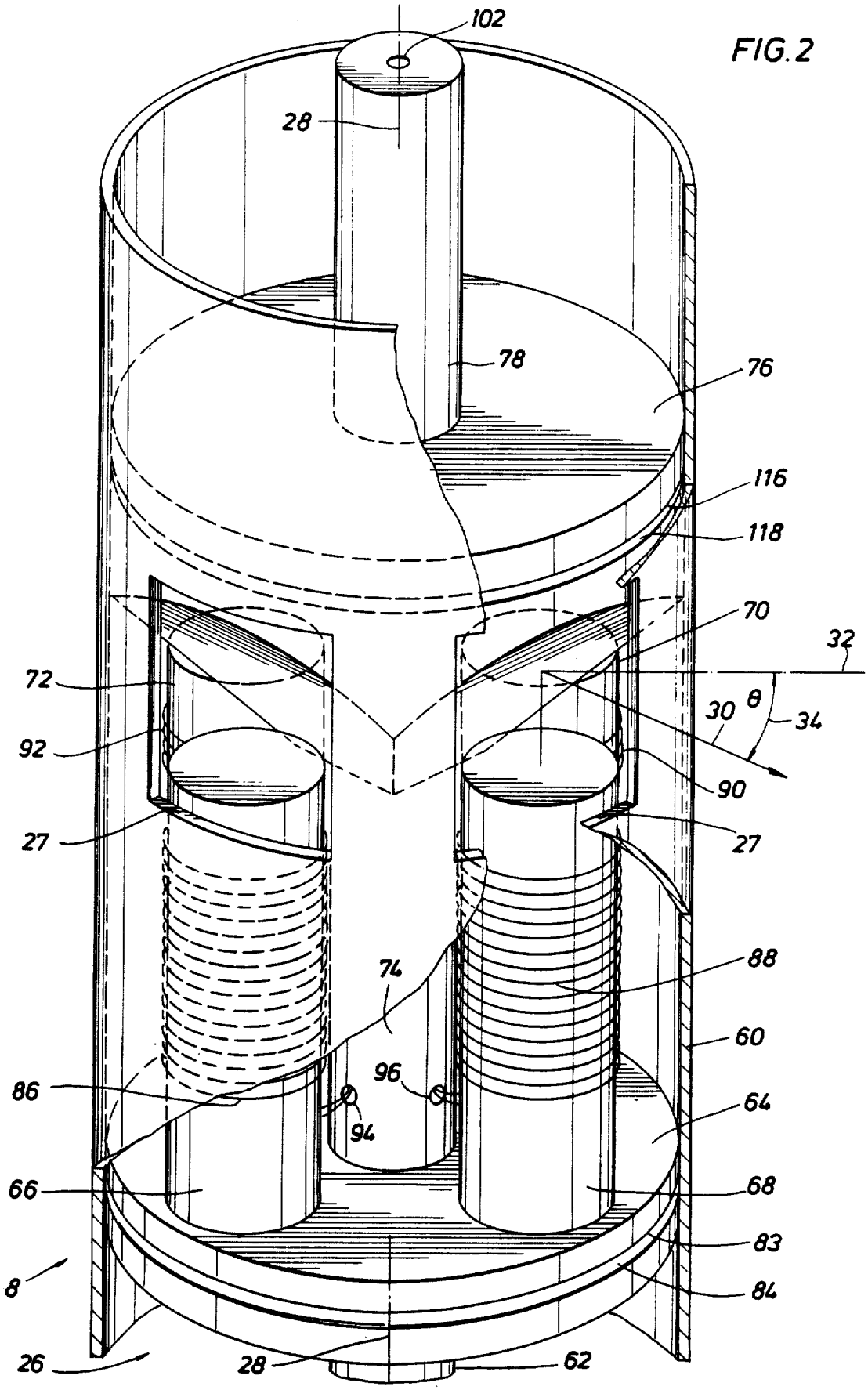
FIG. 2 is a pictorial view, partly in section, depicting a preferred embodiment of a quadrupole shear wave logging source illustrated in FIG. 1.

The multipole nomenclature is based on consecutive powers of two, that is, $2^n$, n being an integer and n=1, 2, 3, and so on indefinitely. Thus, the multipoles include dipole (n=1), the quadrupole (n=2) and the octopole(n=3). The nomenclature for higher order multipoles is based upon $2^n$ with n=4, 5, 6, and so on indefinitely. The multipoles do not include the monopole (n=0).

FIG. 1 is a pictorial view of an acoustic logging system of the present invention adapted particularly for use in the logging of acoustic shear waves in a subsurface earth formation traversed by a borehole. A subsurface formation 10 to be investigated is traversed by a well borehole 12 typically containing a fluid 14. A logging sonde 16 is provided which is adapted to be moved vertically along the borehole 12 to the desired borehole elevation at which the formation is to be investigated.

The sonde 16 is conventionally of a sectional configuration, and may include an acoustic wave generating source section 18, and one or more acoustic wave detector sections such as sections 20, 22, and 24. Each detector section is provided with a corresponding detector, which detectors shall be collectively referred to as detector array 25. Detector sections 20, 22, and 24 contain, respectively, detectors $D_1$, $D_2$, and $D_n$ of detector array 25. Other detector sections containing other detectors of detector array 25 are not shown or are only partly shown in FIG. 1.

Similarly, source section 18 will house acoustic source 26 of the present invention. It will be noted that the detector sections 20, 22, and 24 will typically be physically isolated from the source section 18 by a spacer section 29 in a manner well known in the art, and that sections 18–24 will further be coaxially aligned about a longitudinal central axis 28 to form the cylindrical sonde 16. When the sonde 16 is disposed within borehole 12, central axis 28 will be seen to also preferably approximate the axis of borehole 12.

A closer inspection of FIG. 1 reveals that sections 18, 20, 22, and 24 are each provided with a respective set of acoustic windows 27, 36, 38 and 40. Although each of sets 27, 36, 38, and 40 is shown in FIG. 1 to include four windows, each set may include more than or less than four windows. In operation, source 26 will generate four acoustic wave pulses (only one of which is depicted as pressure wave 30) in a manner to be hereinafter described in greater detail. Each wave pulse will propagate away from source 26 at a $\theta$ angle 34 relative to the plane which includes line 32 and is normal to central axis 28. A portion of the acoustic energy in each wave pulse (including wave 30) will traverse borehole fluid 14, enter the formation 10, and travel longitudinally downward whereupon it will re-enter fluid 14, and be detected by the detectors of detector array 25 in a manner later described in more detail.

A firing and recording control unit 44 is used to control the energization of source 26 at appropriate desired times, functionally depicted by the presence of switch 42. Acoustic wave forms generated by detectors $D_1$, $D_2$ and $D_n$ of detector array 25 in response to acoustic energy impinging thereupon from formation 10 will be delivered on respective signal lines 46, 48 and 50 (and other signal lines, not shown, corresponding to other detectors of detector array 25) to uphole circuitry 52, 54, 56, and 58 for processing, recording, display, and the like as desired.

More particularly, and as functionally depicted by switch 52, each signal on lines 46–50 will be filtered by an appropriate band pass filter 54, amplified by amplifier 56, and then delivered to a time interval unit 58, all in a manner and for purposes well known in the art. Travel times of the acoustic energy from source 16 through formation 10 to a given detector of detector array 25 may then be determined from which velocity of acoustic waves in the formation 10 may be derived.

FIG. 2 is a pictorial view, depicting a preferred embodiment of a quadrupole acoustic wave logging source 26 of the present invention illustrated in FIG. 1 and contained in section 18. The source 26 comprises a hollow cylindrical housing 60 through which passes a lower support mandrel 62. Mandrel 62 supports a disc-shaped base 64 which carries four cylindrical rods 66, 68, 70 and 72. A middle support mandrel 74 interconnects base 64 to an acoustic energy reflector 76, which, in turn, is interconnected to an upper support mandrel 78.

In the upper portion of housing 60 are windows 27 previously mentioned (only two of which are shown for clarity). Each window is an aperture, extending across which is a thin membrane such as rubber sheeting or the like which is substantially acoustically transparent, whereby acoustic pulses generated internally of the housing 60 may be transmitted through the membrane to the surrounding formation 10. The membrane will of course be sealingly engaged to the wall of housing 60, so as to prevent seepage of borehole fluid 14 into the interstices of housing 60, by any convenient means such as metal clips.

The lower base 64 will have provided on the outer cylindrical surface thereof a lower O-ring retainer groove 83 carrying an O-ring 84 which provides sealing engagement between base 64 and the internal surface of housing 60. Also, first, second, third, and fourth helical coils 86, 88, 90, and 92 will be seen disposed about respective rods 66, 68, 70, and 72, such coils being comprised of insulated coil electrical wire.

First and second apertures 94 and 96 extend transversely to middle mandrel 74 for receiving end leads of respective coils 86 and 88, routing these leads to an appropriate source of electrical power to be hereinafter described. Additional apertures (not shown) in mandrel 74 may be provided if necessary for routing ends leads of coils 90 and 92 in like manner.

Acoustic reflector 76 will, similarly to base 64, include an upper O-ring retainer groove 116 which carries an upper O-ring 118 for sealing engagement between the outer cylindrical periphery of reflector 76 and the inner surface of housing 60. In this manner, it will be understood that an inner volume 124 (shown in FIG. 3) will thus be provided which is sealed off from the outside of housing 60 and from areas above and below reflector 76 and base 64, respectively. Volume 124 will preferably be filled with a fluid such as oil or the like for acoustical impedance matching with fluid 14.

Referring now to FIGS. 3 and 4 in greater detail, it will be recalled that these FIGURES are, respectively, elevational and plan views of the acoustic source 26 of FIG. 2 showing additional detail thereof. First, it will be noted that internally and longitudinally of middle mandrel 74, reflector 76 and upper mandrel 78 along central axis 28 respective coaxially aligned passages 98, 100, and 102 are disposed.

Passage 98 communicates with apertures 94 and 96, thereby providing means for routing end leads of coils 86–92 through apertures 94 and 96 and through passages 98–102 to an appropriate source of electrical energy.

Still referring to FIGS. 3 and 4, threaded recesses 104 and 106 are provided in base 64, and threaded recesses 108 and 110 in reflector 76 for threadably receiving matingly threaded end portions of lower, middle and upper mandrels 62, 74, and 78, respectively. Similarly threaded recesses such as 112 and 114 in base 64 provide convenient means for mounting the four rods 66–72 to base 64.

Two permanent magnets 120 and 122 are shown disposed within and carried by reflector 76, each mounted coaxially with and above a respective one of rods 66 and 70, for purposes to be described later in more detail with respect to an alternate embodiment. It will be understood, however, that in the preferred embodiment of FIG. 3 the magnets will be omitted.

In FIG. 4, an X and Y axis, 126 and 128, respectively, have been illustrated perpendicular to each other and intersecting central axis 28 for facilitating the detailed described which follows. For like purpose, a circle 130 has been indicated therein lying in the plane defined by axis 126 and 128 and passing through the longitudinal axes or centers of rods 66–72.

Figure 5:
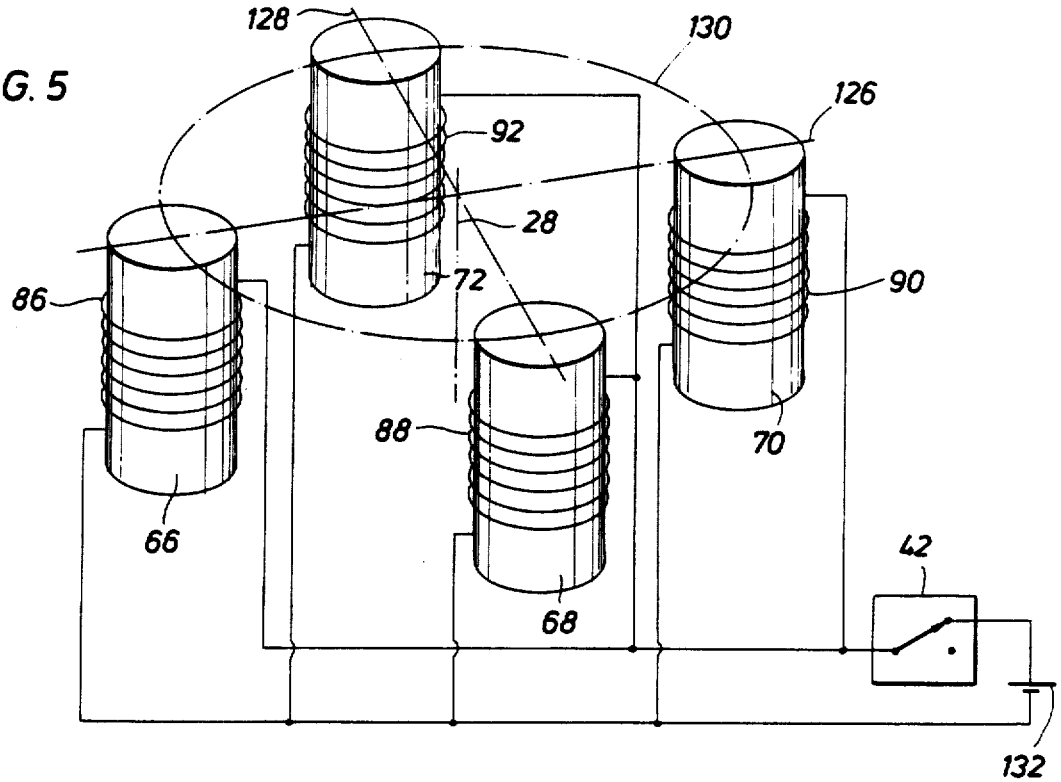
FIG. 5 is a pictorial view of the rod elements and associated coils of the logging source of FIG. 2 illustrating schematically the electrical wiring thereof.

FIG. 5 is a pictorial view of the rods 66–72 and corresponding coils 86–92 of the logging source 26 of FIG. 2, intended to depict functionally the electrical connection thereof and their configuration in more detail. In the preferred embodiment of the present invention, rods 66–72 are each constructed of a ferromagnetic material exhibiting the property known as the magnetostrictive phenomenon whereby when a magnetic field is applied to the material in the direction of its longitudinal axis, corresponding changes in length of the material in the direction of its longitudinal axis are produced.

The magnitude of the change and whether the material expands or contracts upon magnetization is a function of the particular material. Thus, various materials exhibit differing material strain constants (changes in length per unit length due to magnetostriction), some of which may be positive or negative (indicating the material lengthens or shortens with magnetization, respectively). Moreover, such constants may be either large or small (indicating larger or small percentage changes in length for a given magnetic field strength, respectively). Applying the foregoing to the embodiment of FIG. 5, it will be understood that the magnetostrictive phenomenon just described may be utilized to [constuct] *construct* a magnetostrictive vibrator capable of generating an acoustic pressure wave. More particularly, in the embodiment of FIG. 5, rods 66 and 70 will desirably be constructed of a ferromagnetic material known as 2V Permendur having a positive strain constant, whereas rods 68 and 72 may be made of a ferromagnetic material such as nickel having a negative strain constraint with an absolute value less than that of 2V Permendur.

From the foregoing, it will be noted that upon application of a magnetic field to rods 66 and 70 by closing switch 42, and thereby energizing corresponding coils 86 and 90 from electrical energy source 132, the upper circular surfaces of the rods 66 and 70 (which lie in a plane parallel to that defined by axes 126 and 128) will move upwards as the rods 66 and 70 lengthen in the direction of central axis 28. (It will be recalled that the lower ends of rods 66–72 are mounted on base 64 and constrained from longitudinal movement.)

Upon opening the switch 42 and thereby de-energizing coils 86 and 90, rods 66 and 70 will return to their normal length. Accordingly, by varying the strength of the applied magnetic field, as, for example, by rapid opening and closure of switch 42, upper surfaces of rods 66 and 70 will oscillate in phase at the same frequency thereby creating two acoustic waves traveling vertically upwards toward reflector 76 along the axes of rods 66 and 70 and in the direction of central axis 28.

In like manner, because rods 68 and 72 have a strain constant of opposite sign to that of rods 66 and 70, upon simultaneous energization of their corresponding coils 88 and 92 with those of rods 66 and 70, upper circular surfaces of rods 68 and 72 will be made to oscillate in the direction of central axis 28 in phase with each other at the same frequency but 180° out of phase with those of rods 66 and 70. This will create two additional acoustic waves also traveling vertically upwards toward reflector 76 as previously described and out of phase therewith.

Due to the absolute value of the strain constants for 2 V Permendur being larger than that of nickel, for a given magnetic field strength, the amplitude of vibration of rods 66 and 70 would be larger than that of rods 68 and 72. Accordingly, in the embodiment of FIG. 5 just described, the number of turns of coils 86 and 90 may be made less than those of coils 88 and 92 in order to produce vibrations of approximately equal amplitude, which is desirable in order for source 26 to transmit quadrupole acoustic waves into formation 10.

In several embodiments disclosed herein, some of the rods used in constructing a source according to the present invention will have a first strain constant and some will have a second strain constant whose absolute value differs from that of the first strain constant. For example, the absolute value of the strain constant of nickel is about half of that of 2 V Permendur. In these embodiments, the effective strain constants of the rod materials used may be matched by wrapping the rods having larger absolute strain constant with an electrically conducting metal element (which may be a wire) so that the metal element is wrapped between each such rod and the corresponding surrounding energizing coil which produces the magnetic field at the rod. This wrap will partially shield the rod from the magnetic field, thus reducing the effective strain constant of the wrapped rod. For example, in a source having some nickel and some 2 V Permendur rods, a thin aluminum wire wrap around each 2 V Permendur rod will achieve the desired effect of matching the strain constants of the rods.

In FIGS. 6A and 6B there are illustrated a pictorial and plan view, respectively, of the acoustic reflector 76 within the logging sonde 26 of FIG. 2. In particular, the reflector 76 will be seen to define an inverted pyramid truncated by the surface adjacent recess 108. More particularly, the pyramid thus defined will further be seen to have four reflecting faces 134, 136, 138, and 140.

From the orientation of faces 134–140 relative to axes 126 and 128 and the coaxial alignment of reflector 76 along central axis 28, it will be understood that each rod 66–72 is disposed adjacent to and below a corresponding respective one of the faces 134–140, with the longitudinal axis of each rod intersecting its respective face.

The purpose of such alignment may be seen from the arrow 135 which represents an acoustic wave generated from one of the rods 66–72 as just described traveling longitudinally upwards in the direction of central axis 28 and along the axis of the particular rod toward reflector 76. Upon striking reflector 76, the wave will be reflected as wave 30 at a $\theta$ angle 34 relative the plane which includes to horizontal reference line 32 and is normal to central axis 28.

In this manner, by appropriately shaping faces 134–140, vertically traveling acoustic pressure waves generated by each rod 66–72 will be reflected in a direction generally normal to central axis 28 so that the main lobes of the acoustic wave energy reflected from reflector 76 will travel out of source section 18 (through set of windows 27), and into the formation 10 substantially in the four directions indicated by axes 126 and 128.

The reflector 76 is preferably constructed of an efficient acoustic reflector material such as aluminum or steel to maximize transfer of energy from the reflector to the formation. It has also been found desirable that the reflective wave lobes be reflected not at an angle exactly normal to central axis 28 but rather at an offset, desirably in the range of about 20° to about 45° with respect to a plane normal to central axis 28, in order to enhance conversion (in a manner described in the following two paragraphs) of the compressional wave thereby created in borehole fluid 14 to the desired quadrupole shear waves in formation 10. This may, of course, be accomplished by adjusting the angle of incline of faces 134–140 relative to central axis 28, adjusting the orientation of axes of rods 66–72 relative to faces 134–140, or both.

It should be recognized that at the interface between borehole fluid 14 and formation 10, not only will a portion of the compressional wave energy propagating in borehole fluid 14 away from source 26 be converted to acoustic shear wave energy which will also propagate in formation 10, but another portion of such compressional wave energy in fluid 14 will be converted to acoustic compressional wave energy which will propagate in formation 10. The shear waves induced in formation 10 will interfere to produce a quadrupole shear wave in formation 10. Similarly the compressional waves induced in formation 10 will interfere to produce a quadrupole compressional wave in formation 10. The ratio of quadrupole shear wave energy to quadrupole compressional wave energy produced by source 26 in formation 10 will depend on the aforementioned angle at which the pressure waves in fluid 14 are incident at the interface between fluid 14 and formation 10 and will also depend on the source frequency.

For direct acoustic shear wave logging, it is desirable to enhance generation of shear waves in formation 10 relative to generation of compressional waves therein.

This may be accomplished in the manner described in the paragraph immediately preceding the above paragraph. In contrast, for efficient acoustic compressional wave logging it may be desirable to enhance generation of compressional waves in formation 10 relative to generation of shear waves therein.

Source 26, operated in the same mode described herein with reference to quadrupole shear wave logging, may be used for performing quadrupole acoustic compressional wave logging. The quadrupole compressional wave arrival at the detectors will occur prior to the quadrupole shear wave arrival at the detectors, so that the concurrent generation of quadrupole shear waves in formation 10 (with the quadrupole compressional waves of interest in quadrupole compressional wave logging) will not hinder compressional wave logging operations. To efficiently perform quadrupole acoustic compressional wave logging using source 26, it is desirable that the angle of incline of faces 134–140 relative to central axis 28 and the orientation of the axes of rods 66–72 relative to faces 134–140 be adjusted so that the reflective wave lobes propagate in a direction normal to central axis 28, so that generation of compressional waves in formation 10 is enhanced relative to generation of shear waves therein.

It will be apparent to those ordinarily skilled in the art that the dipole, octopole, and other embodiments of the acoustic source of the present invention described below are similarly suitable for either multipole acoustic shear wave logging or for multipole acoustic compressional wave logging.

It has also been noted that it is desirable that the upward traveling acoustic waves from each upper rod 66–72 surface originate from points as radially inward toward central axis 28 as practicable. This is in order to approximate as closely as possible four closely spaced monopole sources which are required for a quadrupole source and may be effected by decreasing the diameter of circle 130 about which the rods 66–72 are evenly spaced.

ALTERNATE EMBODIMENTS

Figure 7:
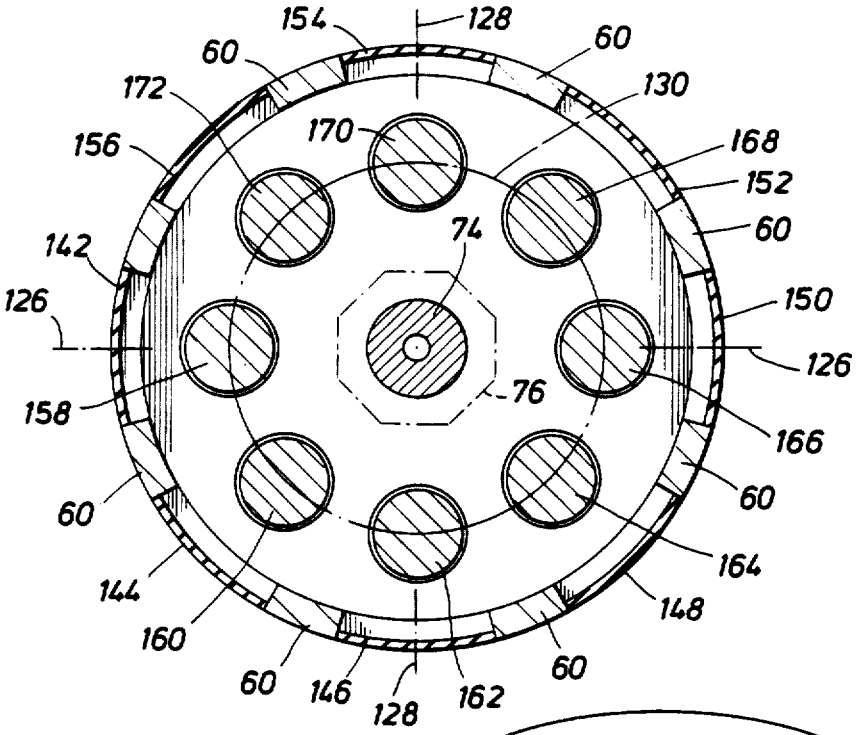
FIG. 7 is a plan view in cross-section of a 16-pole shear wave logging source illustrating an alternate embodiment of the logging source of FIG. 3.
Figure 8A:
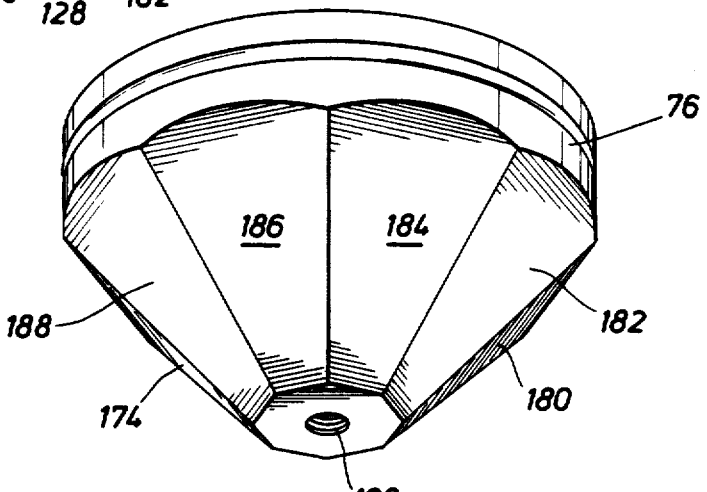
FIG. 8A is a pictorial view of the acoustic reflector of the alternate embodiment of the logging source depicted in FIG. 7.
Figure 8B:
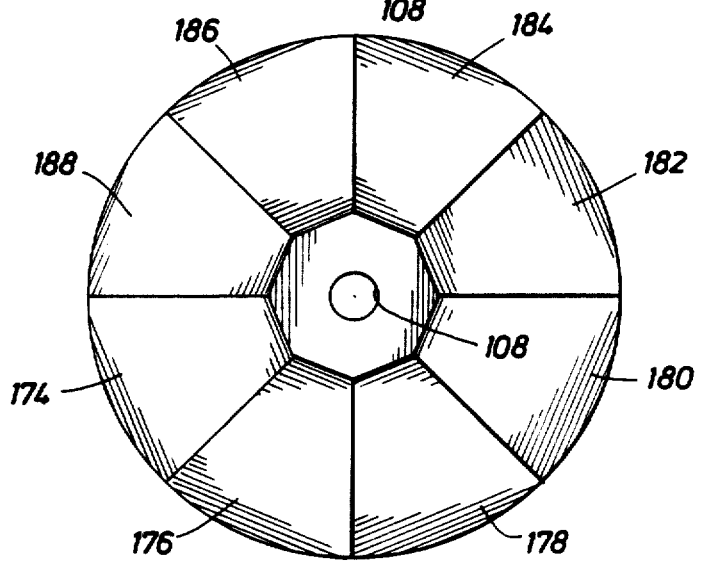
FIG. 8B is a plan (bottom) view of the acoustic reflector depicted in FIG. 8A.

FIGS. 7, 8A, and 8B correspond to FIGS. 4, 6A, and 6B, respectively, in that they depict similar views of an alternate embodiment of the present invention. Specifically, whereas the preceding description of the present invention has been limited to a quadrupole wave generator or source, the invention is not intended to be so limited and fully contemplates other embodiments.

Figure 10:
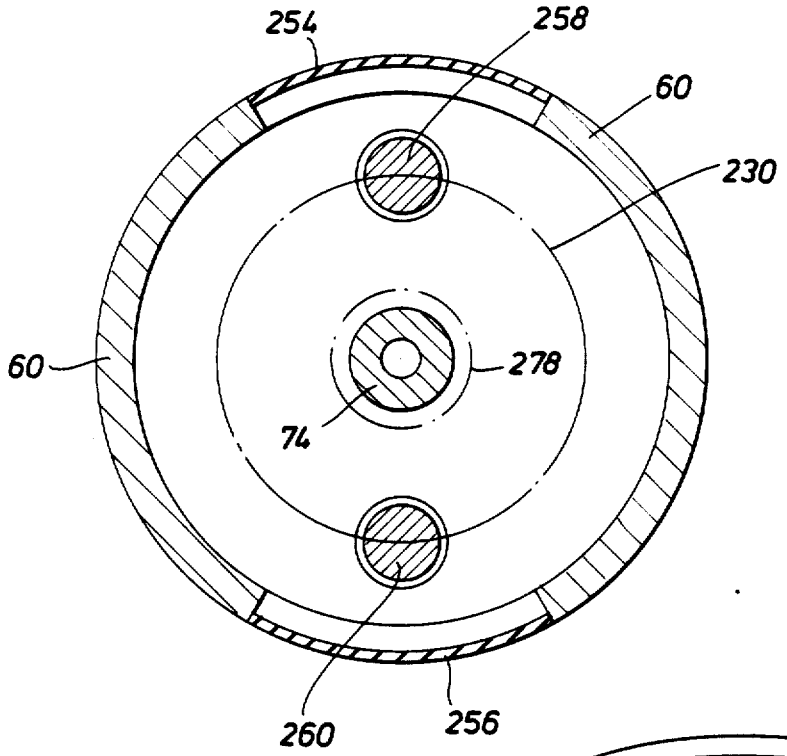
FIG. 10 is a cross-sectional view of a dipole acoustic shear wave source, taken in a plane perpendicular to the longitudinal central axis of the source, illustrating another embodiment of the invention.
Figure 11:
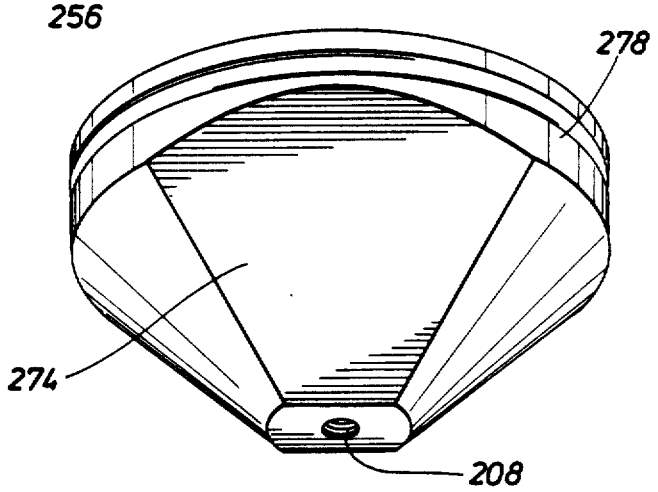
FIG. 11 is a pictorial view of the acoustic reflector of the logging source depicted in FIG. 10.
Figure 12:
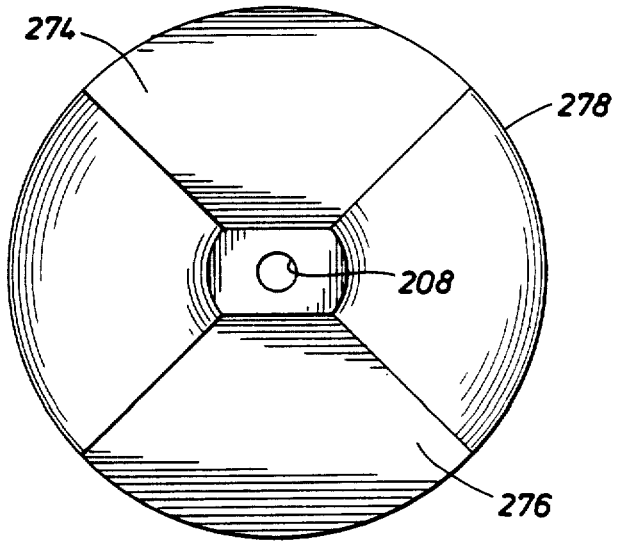
FIG. 12 is a plan (bottom) view of the acoustic reflector depicted in FIG. 11.
Figure 13:
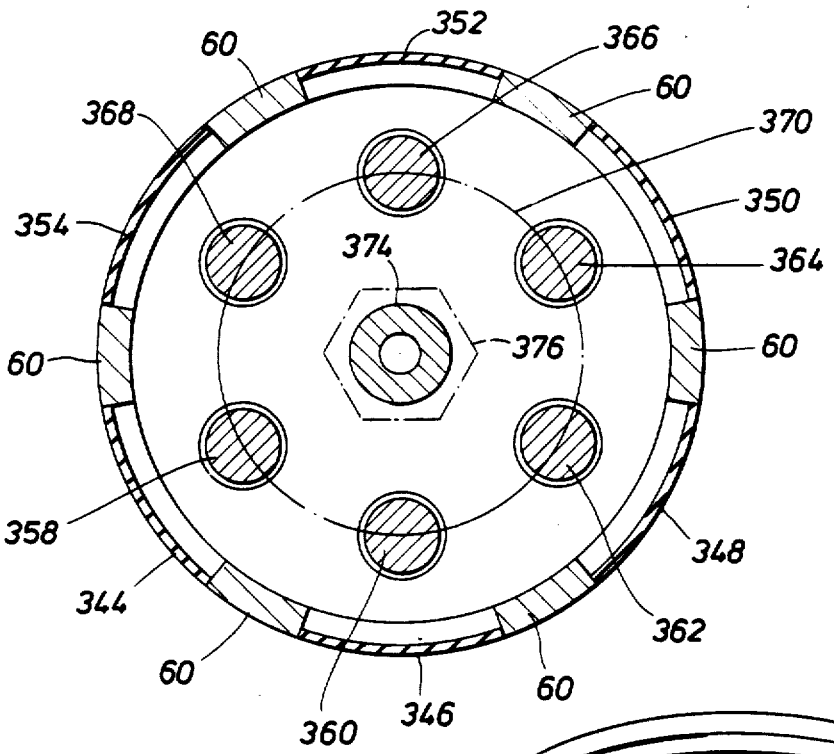
FIG. 13 is a cross-sectional view of an octopole acoustic shear wave source, taken in a plane perpendicular to the longitudinal central axis of the source, illustrating another embodiment of the invention.
Figure 14:
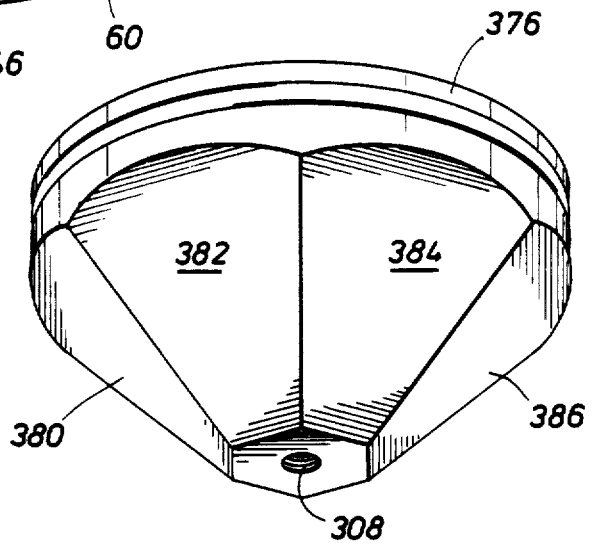
FIG. 14 is a pictorial view of the acoustic reflector of the logging source depicted in FIG. 13.
Figure 15:
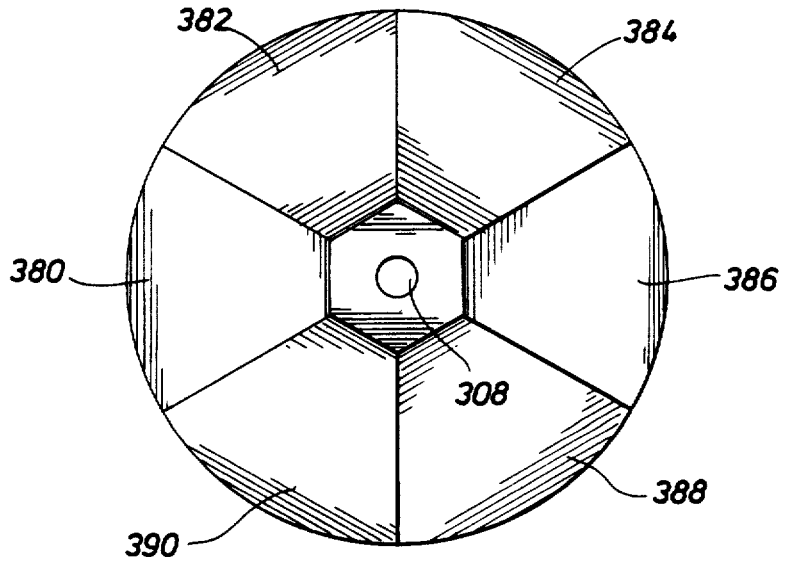
FIG. 15 is a plan (bottom) view of the acoustic reflector depicted in FIG. 14.

Thus, in accordance with the references cited herein, for some applications a dipole acoustic wave source, as illustrated in FIGS. 10, 11, and 12, or a source of higher order than the quadrupole source, such as the octopole acoustic wave source illustrated in FIGS. 13, 14, and 15, or the 16-pole acoustic wave source illustrated in FIGS. 7, 8A, and 8B may be desired.

The number of rods in the embodiments of the dipole, the octopole, and the 16-pole [souce] *source* to be described below does not match the nomenclature of the dipole, octopole, and 16-pole sources. Thus, a dipole ($n=1$) source comprises two times one or two rods. A quadrupole ($n=2$) source comprises two times two or four rods. An octopole ($n=3$), a 16-pole ($n=4$) and a 32-pole ($n=5$) source comprises six, eight, and ten rods respectively. Therefore, in general a $2^n$-pole source will comprise 2n rods, n being an integer where $n=1, 2, 3$, and so on indefinitely.

In general, for a $2^n$-pole source of the present invention, 2n rods (where $n=1, 2, 3$, and so on indefinitely) are disposed substantially evenly about the central axis of a logging sonde. Preferably, the rods are disposed substantially evenly about the central axis. Adjacent rods, with respect to angular position about the central axis, produce pressure waves which are substantially 180° out of phase with respect to each other and which initially propagate toward the reflector and are thereafter reflected generally radially outward from the central axis.

Accordingly, referring now to FIG. 7 in comparison to FIG. 4, it may be appreciated that instead of only four rods 66–72, eight rods 158, 160, 162, 164, 166, 168, 170, and 172 are provided (with corresponding coils which are not shown) as well as eight corresponding windows 142, 144, 146, 148, 150, 152, 154, and 156 radially outwards from the rods.

In similar manner to the embodiment of FIGS. 1–6B, the eight rods 158–172 and corresponding coils will be oriented so that their centers are evenly spaced about the circumference of circle 130 and their axes are parallel to central axis 28. Similarly, the rods will alternate between a first and second ferromagnetic material as circle 130 is circumferentially traversed. Finally, the rods may be energized in a manner similar to that functionally depicted in FIG. 5.

It will thus be understood that in the embodiment of FIGS. 7, 8A, and 8B, instead of four pressure waves being produced which travel upwards within the sonde 16 toward reflector 76, eight such waves will be produced. Accordingly, it is necessary to modify reflector 76 as depicted in FIGS. 8A and 8B so as to provide corresponding reflecting surfaces 174, 176, 178, 180, 182, 184, 186, and 188, which will cause each such wave to be reflected out its respective window 142, 146, 148, 150, 152, 154, and 156, into formation 10 in eight separate and distinct radially outward directions from central axis 28.

FIG. 10 is a cross-sectional view of a dipole acoustic shear wave source illustrating another embodiment of acoustic source 26 of the invention. Instead of four rods, only two rods 258 and 260 are provided (with corresponding helical coils which are not shown) as well as two corresponding windows 254 and 256 radially outwards from rods 258 and 260 respectively.

In a similar manner to the embodiment of FIGS. 1 through 6B, rods 258 and 260 and corresponding coils are oriented substantially 180° away from each other on the circumference of circle 230 and their axes are parallel to central axis 28. Similarly, one of rods 258 and 260 is made of a first magnetostrictive material having a positive strain constant (such as a 2 V Permendur) and the other is made of a second magnetostrictive material having a negative strain constant (such as nickel). Rods 258 and 260 are energized in a manner similar to that functionally depicted in FIG. 5.

It will thus be understood that in the embodiment of FIG. 10, two pressure waves (one 180° out of phase with respect to the other) will be produced as to propagate initially within sonde 16 toward reflector 278. Reflector 278 is positioned above the upper ends of rods 258 and 260 by threading threaded recess 208 onto matingly threaded upper end portion of mandrel 74.

Reflector 278, depicted in FIGS. 11 and 12 is provided with reflecting surfaces 274 and 276, for respectively reflecting the pressure waves from rods 258 and 260 out windows 254 and 256, so as to propagate substantially radially outward from central axis 28. Reflector 278 is generally shaped as an inverted solid cone, truncated by the surface adjacent recess 208, and having reflecting surfaces 274 and 276 formed on oppositely facing regions of its generally conical outer surface. The axes of rods 258 and 260 intersect faces surfaces 274 and 276, respectively, when reflector 278 is properly positioned relative to the rods.

FIG. 13 is a cross-sectional view of an octopole acoustic shear wave source illustrating yet another embodiment of acoustic source 26 of the invention. Referring to FIG. 13 in comparison with FIG. 4, it may be appreciated that instead of only four rods 66–72, six rods 358, 360, 362, 364, 366, and 368 are provided (with corresponding coils which are not shown) as well as six corresponding windows 344, 346, 348, 350, 352, and 354 radially outwards from the rods.

In similar manner to the embodiment of FIGS. 1–6B, the six rods 358–368 and corresponding coils will be oriented so that their centers are evenly spaced about the circumference of circle 370 and their axes are parallel to central axis 28. Similarly, the rods will alternate between a first and second ferromagnetic material as circle 370 is circumferentially traversed. Finally, the rods may be energized in a manner similar to that functionally depicted in FIG. 5.

It will thus be understood that in the embodiment of FIGS. 13, 14, and 15, instead of four pressure waves being produced which travel upwards within the sonde 16 toward reflector 76, six such waves will be produced. Accordingly, it is necessary to employ a modified reflector 376 as depicted in FIGS. 14 and 15 (rather than reflector 76 in the embodiment depicted in FIGS. 6A and 6B) so as to provide six corresponding reflecting surfaces 380, 382, 384, 386, 388, and 390, which will cause each such wave to be reflected out its respective window 344, 346, 348, 350, 352, and 354, into formation 10 in six separate and distinct radially outward directions from central axis 28.

It will be recalled from the foregoing that in the embodiment of FIG. 3 it was mentioned that in an alternate embodiment thereof it is desirable to provide two biasing magnets (such as those two depicted therein as 120, 122). This alternate embodiment will now be discussed in greater detail.

In the alternate embodiment presently being discussed, all the rods thereof such as rods 66–72 of FIG. 3 may be made of the same ferromagnetic material, a material chosen with a relatively high strain constant in order to produce relatively higher vibrational amplitudes of the rods and accordingly a stronger acoustic source.

One problem with using rods of the same material is in achieving the desired hereinbefore noted out-of-phase relationship between the generated acoustic waves (generated by each rod and achieved previously due to use of rods with two differing strain constants). By providing a biased magnetic field on two diametrically opposed rods such as 66 and 70 of the four depicted in FIG. 3, this out-of-phase operation may nevertheless still be achieved.

More particularly, rods 66 and 70 may, for example, be prestrained by corresponding permanent magnets 120 and 122 carried above them in reflector 76 (alternatively electromagnetic coils may be substituted for magnets 120 and 122 in some applications in which permanent magnets might be prohibitively bulky).

These rods 66 and 70 will either be strained further or relieved from prestrained conditions as a function of the direction of the magnetic field applied by corresponding coils 86 and 90 to rods 66 and 70. Whereas magnetostrictive material having a positive strain constant will elongate (and magnetostrictive material having a negative strain constant will contract) with magnetization independent of the sign (positive or negative) of the magnetic field applied, the amount of such movement is related to the absolute magnitude of the applied magnetic field.

Thus, by alternating the direction of the energizing current to coils 86 and 90, the magnitude of the net magnetic field exerted on rods 66 and 70 may be made to vary on either side of the pre-biased or prestrained value, thereby causing the rods 66 and 70 to move in either desired direction of central axis 28 from a prestrained position either to a less or greater strained position. This, in turn, permits creation of the desired out-of-phase motion between diametrically opposed rod pairs 66–70 and 68–72.

Figure 9:
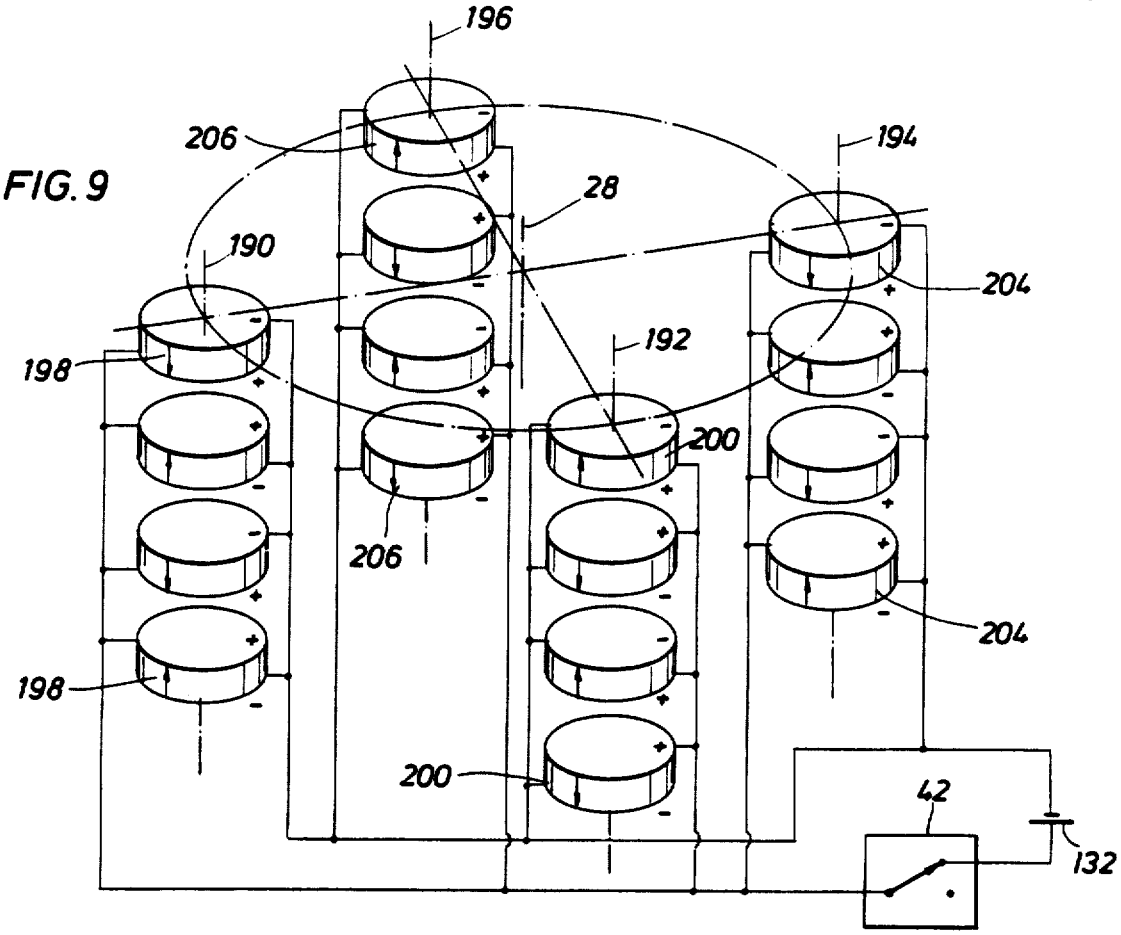
FIG. 9 is a pictorial view of an alternate embodiment of the rod elements and associated coils of the logging source of FIG. 2 illustrating schematically the electrical wiring thereof.

Referring now to FIG. 9, yet another embodiment of the present invention may be seen depicted therein. More particularly, FIG. 9 depicts an alternative method of constructing the vibrating rods utilized in the embodiments of the acoustic wave source illustrated in FIGS. 3, 7, or 10.

Each magnetostrictive rod with associated coil, such as rod 66 and coil 86 of FIG. 3, may have substituted therefor a piezoelectric rod such as the four shown in FIG. 9 in exploded view.

Each rod will be seen to be comprised of a plurality of polarized discs such as disc 198, 200, 204, and 206 of FIG. 9 fashioned from a suitable piezoelectric crystal material, such as that commercially supplied by the Vernitron Company of Bedford, Ohio. These discs will be stacked and coaxially aligned along respective axes 190, 192, 194, and 196. These axes will be seen to correspond to longitudinal axes of previously described rods 66–72 extending parallel to center axis 28.

Piezoelectric crystals have the property that they will either expand or contract in response to an applied electrical potential and whether the crystal expands or contracts is controllable by the direction of the applied potential and the direction of the crystal polarization.

Accordingly, with the crystal discs 198–206 polarized according to the arrows as shown, stacked, and wired, it will be understood that because wiring of stacks aligned along axis 190 and 194 is opposite to those aligned along axis 192 and 196, upon energization of all four stacks from energy source 132 by closing switch 42, two diametrically opposed stacks will expand longitudinally in the direction of central axis 28, whereas the remaining two will contract, thus achieving the desired generation of two sets of out-of-phase longitudinal acoustic waves previously described with respect to the embodiment of FIG. 2.

As previously noted, due to the longitudinal displacement mode of the rods of the present invention and further due to the relatively greater longitudinal dimensions of sonde 16 (as opposed to transverse dimensions) available for housing a vibrating member, it is possible to build acoustic sources in accordance with the teachings of the present invention which may generate extremely powerful out-of-phase acoustic pressure waves in the sonde 16 sufficient to easily establish strong dipole, quadrupole, or higher order shear waves in the formation of interest.

The desired frequency of the acoustic waves to be generated will govern the choice of the particular lengths of rods 66–72 in a manner well known in the art, inasmuch as the natural frequency of the rods, a function of their length, will be related to this desired frequency. However, for acoustic shear wave logging the typical desired frequency ranges of oscillation for rods 66–72 in the quadrupole embodiment shown in FIG. 2 will be in the range of just below 3 KHz to about 14 KHz or even higher, with frequencies about 3 KHz being often typical for direct shear wave logging relatively "soft" formations and about 6 KHz or higher for direct shear wave logging in "hard" formations.

Due to the strength of acoustic waves which may be generated with the sonde of the present invention, it has been found that the first harmonic of the nominal oscillating frequency of the rods (which first harmonic is also present in the oscillations) may be of sufficient magnitude such that the source 26 may be operated for both soft and hard formations at the same frequency.

Moreover, also due to the strength of the instant source, well-to-well logging may even be achieved wherein the formation may be acoustically excited at one borehole situs and the acoustic signature detected at an adjacent borehole situs.

Because oscillating magnetostrictive rods may be provided which are energized by magnetic fields, relatively small power supply requirements of low voltage are required to energize their respective coils. This is a distinct advantage over conventional piezoelectric vibrating elements which characteristically require higher voltage supplies with attendant noise problems and the like. However, when "stacked array" rods of a piezoelectric disc material are substituted for magnetostrictive rods, as in the case of the alternate embodiment of FIG. 9, these problems may be reduced by careful design.

It will be appreciated that the operating principles of the sonde 26 of the present invention disclosed herein may be adapted with relatively minor changes to construct acoustic wave detectors, and such detectors are accordingly specifically within the scope and spirit of the subject invention.

For example, with reference to FIG. 2, it is readily apparent that if the source depicted therein is used as a detector, acoustic waves from the formation to be detected will travel opposite to those generated when it is acting as a source. More particularly, acoustic waves will enter through windows 79, 81, etc., and be reflected downward by reflector 76 onto rods 66–72.

This energy impinging upon rods 66–72 will cause vibrations therein which may be used to induce measurable potential signal levels in coils 86–92 functionally related to the acoustic waves.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

I claim:

1. A method of establishing multiple acoustic waves in a subsurface earth formation traversed by a borehole with a sonde, having a central longitudinal axis, disposed therein, comprising the steps of:

simultaneously generating 2N acoustic pressure waves, where N is an integer not less than one, originating from a corresponding number of discrete locations spaced radially outward from said central longitudinal axis so that said waves will propagate initially along respective wave axes in directions substantially parallel to said central longitudinal axis, said wave axes being oriented so that the projections, in a plane perpendicular to the central longitudinal axis, of lines intersecting the central longitudinal axis and the wave axes define a plurality of approximately equal angles $\alpha$, wherein $\alpha$ is approximately equal to 360°/2N, and so that any first one of the waves traveling along a corresponding first one of the wave axes is substantially out of phase with respect to any second one of the waves traveling along a corresponding second one of the wave axes, where the first wave axis and the second wave axis are separated by angle $\alpha$ with respect to the central longitudinal axis; and reflecting said waves substantially radially outward from said central longitudinal axis into said formation.

2. The method of claim 1, wherein said pressure waves are initially propagated within said sonde and are thereafter reflected radially outward from said sonde.

3. The method of claim 2, wherein said wave axes are substantially equidistant from said central axis.

4. The method of claim 1, wherein said reflected waves include lobes reflected at an angle $\theta$ from a plane perpendicular to said central longitudinal axis, where $\theta$ is greater than zero.

5. The method of claim 4, wherein N=2.

6. The method of claim 4, wherein the directions of said radially outward reflected waves, when projected onto a plane perpendicular to said central axis, define said plurality of angles $\alpha$, and wherein said generated pressure waves have an amplitude and frequency such that said reflected waves will interfere to generate an acoustic multipole shear wave in said formation.

7. Apparatus for establishing multipole acoustic waves in a subsurface each formation traversed by a borehole with a sonde, having a central longitudinal axis, disposed therein, comprising:

acoustic wave generator means for simultaneously generating 2N acoustic pressure waves, where N is an integer not less than one, originating from a corresponding number of discrete locations spaced radially outward from said central longitudinal axis so that said waves will propagate along respective wave axes in directions substantially parallel to said central longitudinal axis, said wave axes being oriented so that the projections, in a plane perpendicular to the central longitudinal axis, of lines intersecting the central longitudinal axis and the wave axes define a plurality of approximately equal angles $\alpha$, wherein $\alpha$ is approximately equal to 360°/2N, and so that any first one of the waves traveling along a corresponding first one of the wave axes is substantially out of phase with respect to any second one of the waves traveling along and corresponding second one of the wave axes, where the first wave axis and the second waves axis are separated by angle $\alpha$ with respect to the central longitudinal axis; and acoustic wave reflector means for reflecting said waves in substantially radially outward directions from said central longitudinal axis into said formation.

8. The apparatus of claim 7, wherein N=2.

9. The apparatus of claim 7, wherein said [vibrations] *acoustic waves* have an amplitude and frequency such that said reflected waves are capable of interfering to generate an acoustic multipole shear wave in said formation.

10. The apparatus of claim 7, wherein said wave axes are substantially equidistant from said central axis.

11. The apparatus of claim 7, wherein said generator means includes a plurality of rod means each longitudinally coaxial to a different corresponding one of said wave axes for establishing vibrations in the direction of said wave axes.

12. The apparatus of claim 11, wherein each of said plurality of rod means is comprised of piezoelectric material which vibrates in the direction of the wave axis corresponding thereto when energized by a changing electrical potential.

13. The apparatus of claim 11, wherein said acoustic wave reflector means comprises a plurality of acoustic reflector face means each for a different one of said waves and facing a different one of said substantially radially outward directions from said central axis, for reflecting each of said different ones of said plurality of waves in a respective said different one of said substantially radially outward directions.

14. The apparatus of claim 11, wherein each of said rod means is comprised of a magnetostrictive material having a strain constant, which vibrates in the direction of the wave axis corresponding thereto when in the presence of a changing magnetic field in said direction.

15. The apparatus of claim 14, wherein a next one of said plurality of rod means, and each one of said plurality of rod means having a wave axis separated from the wave axis corresponding to said next one of said plurality of rod means by an angle equal to $2n\alpha$ with respect to central axis are comprised of a first magnetostrictive material having a first strain constant, and wherein every other one of said plurality of rod means is comprised of a second magnetostrictive material having a second strain constant different from said first strain constant, where n is a positive integer.

16. The apparatus of claim 15, wherein said first magnetostrictive material is nickel and second magnetostrictive material is 2 V Permendur.

17. The apparatus of claim 15, wherein the absolute value of the first strain constant is larger than that of the second strain constant, and also comprising:

an electrically conducting metal element wrapped about each of said rod means comprised of a material having said first strain constant so that the absolute value of the effective strain constant of each of said wrapped rod means is reduced to a value less than the absolute value of said first strain constant.

18. The apparatus of claim 14, wherein each of said plurality of rod means has substantially the same strain constant.

19. The apparatus of claim 18, also comprising:

pre-biasing means for establishing a constant selected magnetic field adjacent predetermined ones of said plurality of rod means.

20. The apparatus of claim 19, wherein said pre-biasing means comprises a permanent magnet.

21. The apparatus of claim 19, wherein said pre-biasing means comprises an electromagnetic coil.

22. The apparatus of claim 12, wherein each of said rod means is comprised of a plurality of discs of said piezoelectric material stacked longitudinally in the direction of the wave axis corresponding thereto.

23. The apparatus of claim [22] *13*, wherein each of said plurality of face means is oriented for reflecting a different one of said waves at an angle $\theta$ from plane perpendicular to said central axis, where $\theta$ is greater than zero.

24. The apparatus of claim 13, wherein the number of said plurality of rod means is equal to 2N and the number of said plurality of face means is equal to 2N.

25. The apparatus of claim 13, wherein said acoustic wave reflector means defines an inverted pyramid in coaxial alignment with said central axis, said pyramid having faces, each of which comprises a different one of said plurality of face means, each of said faces being oriented above a respective one of said rod means and being further intersected by one of said wave axes corresponding to said respective one of said rod means.

*26. A method of detecting multipole acoustic waves in a subsurface earth formation traversed by a borehole with a sonde having a central longitudinal axis disposed therein, said multipole acoustic waves creating 2N acoustic pressure waves in the borehole that propagate radially inwardly toward the sonde, comprising the steps of:*

*reflecting the 2N acoustic pressure waves traveling radially inwardly toward the sonde so that the reflected 2N acoustic pressure waves travel along respective wave axes substantially parallel to the central longitudinal axis of the sonde; and*

*simultaneously detecting 2N acoustic pressure waves, where N is an integer not less than one, at a corresponding number of discrete locations spaced radially outward from said central longitudinal axis, said reflected wave axes being oriented so that the projections, in a plane perpendicular to the central longitudinal axis, of lines intersecting the central longitudinal axis and the wave axes define a plurality of approximately equal angles $\alpha$, wherein $\alpha$ is approximately equal to 360°/2N, and so that any first one of the waves traveling along a corresponding first one of the wave axes is substantially out of phase with respect to any second one of the waves traveling along a corresponding second one of the wave axes, where the first wave axis and the second wave axis are separated by angle $\alpha$ with respect to the central longitudinal axis.*

*27. The method of claim 26, wherein said reflected wave axes are substantially equidistant from said central axis.*

*28. The method of claim 26 wherein said acoustic pressure waves propagating toward the sonde include lobes reflected at an angle r from a plane perpendicular to said central longitudinal axis, where r is greater than zero.*

*29. The method of claim 28, wherein N=2.*

*30. The method of claim 28, wherein the directions of the wave axes of the acoustic pressure waves reflected substantially parallel to the central longitudinal axis, when projected outwardly toward the formation and then projected onto a plane perpendicular to said central axis, define said plurality of angles $\alpha$.*

*31. Apparatus for detecting multipole acoustic waves in a subsurface earth formation traversed by a borehole with a sonde having a central longitudinal axis disposed therein, wherein said multipole acoustic waves in the formation*

*create 2N acoustic pressure waves propagating radially toward the sonde, said apparatus comprising:*

*acoustic wave detector means for simultaneously detecting 2N acoustic pressure waves, where N is an integer not less than one, at a corresponding number of discrete locations spaced radially outward from said central longitudinal axis, said waves propagating along respective wave axes in directions substantially parallel to said central longitudinal axis, said wave axes being oriented so that the projections, in a plane perpendicular to the central longitudinal axis, of lines intersecting the central longitudinal axis and the wave axes define a plurality of approximately equal angles α, wherein α is approximately equal to 360°/2N, and any first one of the waves traveling along a corresponding first one of the wave axes is substantially out of phase with respect to any second one of the waves traveling along a corresponding second one of the wave axes, and the first wave axis and the second waves axis are separated by angle α with respect to the central longitudinal axis; and*

*acoustic wave reflector means for reflecting said acoustic pressure waves propagating radially toward toward the sonde so that such waves propagate along respective wave axes substantially parallel to the central longitudinal axis of the sonde.*

*32. The apparatus of claim 31, wherein N=2.*

*33. The apparatus of claim 32, wherein said wave axes are substantially equidistant from said central axis.*

*34. The apparatus of claim 31, wherein said detector means includes a plurality of rod means each longitudinally coaxial to a different corresponding one of said wave axes for detecting vibrations in the direction of said wave axes.*

*35. The apparatus of claim 34, wherein said plurality of rod means is comprised of piezoelectric material which produces measurable signals in response to vibrations in the direction of the wave axis corresponding thereto.*

*36. The apparatus of claim 34, wherein said acoustic wave reflector means comprises a plurality of acoustic reflector face means each for a different one of said waves and facing a different substantially radially outward direction from said central axis.*

*37. The apparatus of claim 34, wherein each of said rod means is comprised of a magnetostrictive material having a strain constant, which when vibrated in the direction of the wave axis corresponding thereto is capable of creating a changing magnetic field in said direction.*

*38. The apparatus of claim 37, wherein a next one of said plurality of rod means, and each one of said plurality of rod means having a wave axis separated from the wave axis corresponding to said next one of said plurality of rod means by an angle equal to 2nα with respect to said central axis are comprised of a first magnetostrictive material having a first strain constant, and wherein every one of said plurality of rod means is comprised of a second magnetostrictive material having a second strain constant different from said first strain constant, where n is a positive integer.*

*39. The apparatus of claim 38, wherein said first magnetostrictive material is nickel and said second magnetostrictive material is 2V Permendur.*

*40. The apparatus of claim 39, wherein the absolute value of the first strain constant is larger than that of the second strain constant, and also comprising:*

*an electrically conducting metal element wrapped about each of said rod means comprised of a material having said first strain constant so that the absolute value of the effective strain constant of each of said wrapped rod means is reduced to a value less than the absolute value of said first strain constant.*

*41. The apparatus of claim 37, wherein each of said plurality of rod means has substantially the same strain constant.*

*42. The apparatus of claim 41, also comprising:*

*pre-biasing for establishing a constant selected magnetic field adjacent predetermined ones of said plurality of rod means.*

*43. The apparatus of claim 42, wherein said pre-biasing means comprises a permanent magnet.*

*44. The apparatus of claim 42, wherein said pre-biasing means comprises an electromagnetic coil.*

*45. The apparatus of claim 35, wherein each of said rod means is comprised of a plurality of discs of said piezoelectric material stacked longitudinally in the direction of the wave axis corresponding thereto.*

*46. The apparatus of claim 36, wherein the number of said plurality of rod means is equal to 2N and the number of said plurality of face means is equal to 2N.*

*47. The apparatus of claim 36, wherein said acoustic wave reflector means defines an inverted pyramid in coaxial alignment with said central axis, said pyramid having faces, each of which comprises a different one of said plurality of face means, each of said faces being oriented above a respective one of said rod means and being further intersected by one of said wave axes corresponding to said respective one of said rod means.*

*48. The apparatus of claim 36, wherein each of said plurality of face means is oriented for reflecting a different one of said waves at an angle r from a plan perpendicular to said central axis, where r is greater than zero.*

*49. Apparatus for detecting multipole acoustic waves in a subsurface earth formation traversed by a borehole with a sonde having a central longitudinal axis disposed therein, wherein said multipole acoustic waves in the formation create 2N acoustic pressure waves propagating radially toward the sonde, said apparatus comprising:*

*acoustic wave reflector means for reflecting said acoustic pressure waves propagating radially toward the sonde at a plurality of approximately equal angles α in a plane substantially perpendicular to the axis of the sonde, wherein α is approximately equal to 360°/2N, so that such reflected waves propagate along respective wave axes substantially parallel to the central longitudinal axis of the sonde; and*

*acoustic wave detector means for simultaneously detecting the 2N acoustic pressure waves, where N is an integer not less than one, at a corresponding number of discrete locations spaced radially outward from said central longitudinal axis, said waves propagating along respective wave axes in directions substantially parallel to said central longitudinal axis and any first one of the waves traveling along a corresponding first one of the wave axes is substantially out of phase with respect to any second one of the waves traveling along a corresponding second one of the wave axes.*

*50. The apparatus of claim 49, wherein said detector means includes a plurality of rod means each longitudinally coaxial to a different corresponding one of said wave axes for detecting vibrations in the direction of said wave axes.*

*51. The apparatus of claim 50, wherein said plurality of rod means is comprised of piezoelectric material which produces measurable signals in response to vibrations in the direction of the wave axis corresponding thereto.*

*52. The apparatus of claim 50, wherein said acoustic wave reflector means comprises a plurality of acoustic*

*reflector face means each for a different one of said waves and facing a different substantially radially outward direction from said central axis.*

*53. The apparatus of claim 50, wherein each of said rod means is comprised of a magnetostrictive material having a strain constant, which when vibrated in the direction of the wave axis corresponding thereto is capable of creating a changing magnetic field in said direction.*

* * * * *